Patented Dec. 20, 1949

2,491,477

UNITED STATES PATENT OFFICE 2,491,477

ADHESIVE CEMENT HAVING A BUTADIENE-ACRYLONITRILE COPOLYMER BASE

Eugene M. Chmiel, Detroit, Mich., assignor to Minnesota Mining & Manufacturing Company, St. Paul, Minn., a corporation of Delaware No Drawing. Application December 7, 1943, Serial No. 513,293

3 Claims. (Cl. 154—43)

This invention relates to adhesive cements.

Natural rubber may be made to adhere well to various surfaces, even including polished metal surfaces, by the addition of tackifiers such as rosin, ester gum, coumarone-indene resins and the like. These same tackifiers have also proven useful in obtaining adhesion with various synthetic rubbers, such as polyisobutylene, poly ethyl acrylate, and copolymers of butadiene and styrene. Copolymers of butadiene and acrylonitrile, however, have resisted all attempts to provide adhesiveness in this way. In spite of their many desirable properties, in particular their resistance to gasoline-type solvents (composed largely of aliphatic hydrocarbons), these polymers have therefore not found usefulness in providing base materials for the production of adhesive cements.

I have now discovered that adhesive cements having excellent and previously unexpected adhesion both to polished metal surfaces and to the surfaces of various synthetic rubbery polymers, as well as to other surfaces, may be obtained by combining a properly compounded tough, non-tacky, gasoline-insoluble, rubbery butadiene-acrylonitrile copolymer with a low-melting, gasoline-insoluble, compatible amino-aldehyde resin in a suitable volatile solvent. Such cements are particularly useful in adhesively attaching vulcanized or unvulcanized synthetic rubbery polymers, even including plasticized polymers, to smooth polished metal surfaces. They also possess excellent bonding action on polyvinyl resins, cork, fabric, wood and many other surfaces.

An object of my invention is therefore the production of an adhesive cement from a butadiene-acrylonitrile copolymer base. A further object is the production of an adhesive cement which is insoluble in gasoline. Another object is the production of a gasoline-resistant surface coating which is adhesively bonded to a supporting member, and which is substantially tackfree. Another object is the production of an adhesive cement which is not adversely affected by moderate extremes of heat or cold. A still further object is the production of an adequate cementitious bond between such diverse surfaces as metal and synthetic rubber, metal and fabric, synthetic rubber and wood, etc. by means of an adhesive cement containing a butadiene-acrylonitrile polymer base. Other objects and advantages will be apparent from a consideration of the specification and the appended claims.

It is of course to be understood that by "adhesive cement" I mean either a solution or dispersion in a volatile liquid vehicle, or else the dried residue remaining on evaporation of said vehicle, as will be apparent from the context. Thus the cement (solution) is applied to the surfaces to be joined as a liquid; after evaporation of the vehicle, the cement (dried residue) remains as a firmly bonded film.

In producing a preferred embodiment of my invention, I may use the following formula, in which all parts are by weight.

Compounded base

| | |
|---|---:|
| Butadiene-acrylonitrile copolymer | 100 |
| Zinc oxide | 5 |
| Sulfur | 2 |
| Carbon black | 5 |
| Dibenzyl ether | 4 |

Finished cement

| | |
|---|---:|
| Compounded base | 80 |
| Glycerine ester of fraction of wood rosin soluble in alcohol but substantially insoluble in light petroleum hydrocarbons | 20 |
| Aldol-alpha-naphthylamine | 10 |
| Ethylene dichloride | 440 |

The butadiene-acrylonitrile copolymer is prepared by known methods from butadiene and acrylonitrile in approximately a 74:26 ratio, and is a tough, elastic gasoline-insoluble rubbery solid. "Chemigum I," sold by Goodyear Tire & Rubber Co., is a good example of a suitable copolymer of this type. Aldol-alpha-naphthylamine is a cherry-red, brittle, low melting resinous product insoluble in gasoline and compatible with the butadiene-acrylonitrile copolymer, and commonly used in small percentages as an antioxidant for rubber goods. "Age-Rite Resin," sold by R. T. Vanderbilt Co., is a good commercial example of such a product.

A good commercial example of the glycerine ester, mentioned in the formula, is "Vinsol Ester Gum," made and sold by Hercules Powder Co. This resin may be characterized as a polyhydric alcohol ester of an alcohol-soluble resin obtained by extracting pine wood with a coal tar hydrocarbon to produce an extract containing coal tar hydrocarbon, volatile materials such as turpentine, and normally solid resinous materials, evaporating the coal tar hydrocarbon and volatile portions of the extract to produce a solid residue, extracting rosin from said residue with a light petroleum hydrocarbon, separating the said rosin extract from the remaining insoluble residue and recovering the said insoluble residue. It is quite different than the ordinary ester gum made by reacting glycerine and wood rosin, especially in respect to gasoline solubility, being substantially insoluble in light petroleum hydrocarbons.

Small particle size, easily dispersible varieties of zinc oxide, sulfur, and carbon black are preferred.

The butadiene-acrylonitrile copolymer ("Chemigum I") is milled on a rubber mill, with addition of the dibenzyl ether, a non-volatile plasticizer, to soften the stock and permit easier milling. The zinc oxide, sulfur, and carbon black are milled in, and the stock removed from the mill and stored at room temperature. After 24 hours, it is again milled for 15 minutes; this process is repeated twice more. After the final milling, the stock is immediately cut into small pieces and placed in a churn containing the solvent, i. e. the ethylene dichloride. The resinous components are then added and churning is continued until a smooth homogeneous solution or dispersion is obtained.

Softening of the polymer, or use of an originally soft variety, is important in order to obtain satisfactory incorporation of the pigments and sulfur on the mill, and also to insure a smooth, stable solution or dispersion. Zinc oxide and sulfur provide for curing or strengthening of the cement after it has been applied and the solvent evaporated. Carbon black likewise acts as a strengthening agent and, in addition, gives desired color. The effect of variations in these and similar ingredients on the properties of synthetic polymers will be understood by those skilled in the art.

Aldol - alpha - naphthylamine ("Age - Rite Resin") is commonly used in rubber compounds as an anti-oxidant or anti-ager. For such use, amounts of the order of 0.5-2.0 parts per 100 parts of rubber are recommended. It has been found, however, that much larger amounts, such as 10-20 parts per hundred, based on the butadiene-acrylonitrile copolymer, provide the entirely unexpected result of imparting tackiness to the mixture. At the same time, however, the film strength of the cement is weakened. But I have been able to offset this effect by adding a hard, high melting, gasoline-insoluble resin which will improve the film strength without greatly reducing the adhesion. "Vinsol Ester Gum" is preferred for this use; however, resins such as alkyd or phenolic resins may be substituted for some less critical uses. Where resistance to gasoline is not required, hard coumarone-wood indene resins, or even rosin or ordinary ester gum, may in some cases be used. The amount of strengthening resin which may be added to the composition depends on the properties of the individual resin as well as on the requirements of the cement as to adhesion, solvent resistance, and effect of temperature; where "Vinsol Ester Gum" is to be used in conjunction with "Age-Rite Resin," the weight of the former should preferably be not greater than three times the weight of the latter.

Ethylene dichloride is not readily inflammable, and is readily volatile; it is therefore preferred in most cases. However, other suitable solvents may be used without departing from the scope of my invention; for example, methyl ethyl ketone may be used. Likewise, the amount of solvent may be varied within wide limits, depending on the viscosity required in the particular use to which the cement is to be put. Thus, spray application will ordinarily require a higher percentage of solvent than will application by brush, trowel, or rolls.

It will be seen from what has already been said that the composition of this invention provides some significant new results. It makes copolymers of the butadiene-acrylonitrile type available as highly useful adhesives. Also it makes available adhesive compositions having a new and advantageous combination of properties.

While the invention has been described and illustrated in various details, it will be understood that this is by way of exemplification and not by way of limitation. All variations and embodiments within the broad scope of my invention, and which distinguish over the prior art, are comprehended.

Having thus described my invention, what I claim as new and desire to secure by Letters Patent is:

1. An adhesive cement consisting essentially of 80 parts of a compounded base containing at least 80% of a rubbery copolymer of butadiene and acrylonitrile, 20 parts of a resinous ester, 10 parts of aldol - alpha - naphthylamine, and an amount of a volatile vehicle sufficient to provide spreadability of the cement; said resinous ester being the glycerine ester of an alcohol-soluble, substantially gasoline-insoluble resinous extract of pine wood obtained by extracting said pine wood with a coal tar hydrocarbon to produce an extract containing coal tar hydrocarbon, volatile materials such as turpentine, and normally solid resinous materials, evaporating the coal tar hydrocarbon and volatile portions of the extract to produce a solid residuum, extracting rosin from said residue with a light petroleum hydrocarbon, separating the said rosin extract from the then remaining insoluble residue and recovering the said insoluble residue.

2. An adhesive cement composition capable of forming a self-adherent bond to smooth metal surfaces when deposited and dried in contact therewith, comprising, in solution in a volatile solvent, 100 parts of a rubbery copolymer of monomers consisting substantially of butadiene and acrylonitrile, from 10 to 20 parts of aldol-alpha-naphthylamine, and an amount of a resinous ester sufficient to provide improved film strength but not more than about three times that of said aldol - alpha - naphthylamine; said resinous ester being the glycerine ester of an alcohol - soluble, substantially gasoline-insoluble resinous extract of pine wood obtained by extracting said pine wood with a coal tar hydrocarbon to produce an extract containing coal tar hydrocarbon, volatile materials such as turpentine, and normally solid resinous materials, evaporating the coal tar hydrocarbon and volatile portions of the extract to produce a solid residuum, extracting rosin from said residue with a light petroleum hydrocarbon, separating the said rosin extract from the then remaining insoluble residue and recovering the said insoluble residue.

3. A composite structure comprising a metal body and another solid body maintained in fixed relationship to each other by an interspersed thin layer of an adhesive cement adhesively self-bonded to a surface of the metal body and the other solid body and consisting of the dried residue of the adhesive cement of claim 1.

EUGENE M. CHMIEL.

(References on following page)

REFERENCES CITED

The following references are of record in the file of this patent:

UNITED STATES PATENTS

| Number | Name | Date |
|---|---|---|
| 2,114,393 | Lane | Apr. 19, 1938 |
| 2,193,026 | Hall | Mar. 12, 1940 |
| 2,227,991 | Winkelmann et al. | Jan. 7, 1941 |
| 2,325,981 | Sarbach | Aug. 3, 1943 |
| 2,337,464 | Hecht et al. | Dec. 21, 1943 |
| 2,340,699 | Sarbach | Feb. 1, 1944 |

FOREIGN PATENTS

| Number | Country | Date |
|---|---|---|
| 705,104 | Germany | Apr. 17, 1941 |

OTHER REFERENCES

Pages 55, 58, 59, and 64 of article by Stocklin, Trans. Inst. of Rubber Ind., vol. 15, June 1939.

The Vanderbilt 1942 Rubber Handbook, pub. by R. T. Vanderbilt Co., N. Y., pp. 182, 232, 233 and 318.